US010024238B2

(12) United States Patent
Phillips et al.

(10) Patent No.: US 10,024,238 B2
(45) Date of Patent: Jul. 17, 2018

(54) COOLING SYSTEM WITH A BEARING COMPARTMENT BYPASS

(71) Applicant: UNITED TECHNOLOGIES CORPORATION, Farmington, CT (US)

(72) Inventors: Justin J. Phillips, West Suffield, CT (US); James D. Hill, Tolland, CT (US); William K. Ackermann, East Hartford, CT (US); Chris J. Niggemeier, Manchester, CT (US); Gabriel L. Suciu, Glastonbury, CT (US); Anthony R. Bifulco, Ellington, CT (US); Julian Partyka, West Springfield, MA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 466 days.

(21) Appl. No.: 14/594,663

(22) Filed: Jan. 12, 2015

(65) Prior Publication Data
US 2015/0285147 A1 Oct. 8, 2015

Related U.S. Application Data

(60) Provisional application No. 61/974,685, filed on Apr. 3, 2014.

(51) Int. Cl.
*F02C 7/18* (2006.01)
*F02C 6/08* (2006.01)
(Continued)

(52) U.S. Cl.
CPC ............. *F02C 7/185* (2013.01); *F01D 5/082* (2013.01); *F01D 9/06* (2013.01); *F01D 25/125* (2013.01);
(Continued)

(58) Field of Classification Search
CPC ........ F01D 25/08; F01D 25/12; F01D 25/125; F01D 5/08; F01D 9/065; F01D 5/186;
(Continued)

(56) References Cited

U.S. PATENT DOCUMENTS

2002/0076318 A1 6/2002 Patel
2011/0088405 A1* 4/2011 Turco ..................... F01D 5/081
60/782

(Continued)

OTHER PUBLICATIONS

European Search Report for Application No. 15162510.0-1607; dated Aug. 20, 2015; 9 pgs.

*Primary Examiner* — Justin Seabe
*Assistant Examiner* — Behnoush Haghighian
(74) *Attorney, Agent, or Firm* — Cantor Colburn LLP

(57) ABSTRACT

A cooling system for providing a buffer cooled cooling air to a turbine section of a gas turbine engine is disclosed. The cooling system may comprise a first conduit configured to transmit a cooling air toward the turbine section, a heat exchanger configured to cool a bleed airflow diverted from the first conduit to provide a buffer air, and a bypass conduit configured to direct at least a portion of the buffer air through at least one passageway that bypasses a bearing compartment of the gas turbine engine. The cooling system may further comprise a manifold configured to allow the cooling air exiting the first conduit and the buffer air exiting the bypass conduit to mix and provide the buffer cooled cooling air, and a nozzle assembly configured to deliver the buffer cooled cooling air to the turbine section.

17 Claims, 3 Drawing Sheets

(51) Int. Cl.
 *F01D 25/08* (2006.01)
 *F01D 25/12* (2006.01)
 *F01D 9/06* (2006.01)
 *F01D 5/18* (2006.01)
 *F01D 5/08* (2006.01)

(52) U.S. Cl.
 CPC ............... *F02C 6/08* (2013.01); *F01D 5/081* (2013.01); *F01D 5/186* (2013.01); *F01D 5/187* (2013.01); *F01D 9/065* (2013.01); *F01D 25/08* (2013.01); *F01D 25/12* (2013.01); *F05D 2220/32* (2013.01); *F05D 2260/213* (2013.01); *F05D 2260/221* (2013.01); *F05D 2260/232* (2013.01); *Y02T 50/671* (2013.01); *Y02T 50/676* (2013.01)

(58) Field of Classification Search
 CPC . F01D 5/187; F01D 5/081; F01D 9/06; F05D 2260/20; F05D 2260/202; F05D 2260/205; F05D 2260/232; F05D 2220/32; F05D 2260/221; F05D 2260/213; F02C 7/185; F02C 6/08
 USPC ........ 415/115, 116, 175, 176, 177, 178, 180
 See application file for complete search history.

(56) References Cited

U.S. PATENT DOCUMENTS

| | | |
|---|---|---|
| 2013/0219917 A1 | 8/2013 | Suciu et al. |
| 2013/0219918 A1 | 8/2013 | Suciu et al. |

\* cited by examiner

COOLING SYSTEM WITH A BEARING COMPARTMENT BYPASS

CROSS-REFERENCE TO RELATED APPLICATION

This application is a non-provisional claiming priority under 35 USC § 119(e) to U.S. Provisional Ser. No. 61/974,685 filed on Apr. 3, 2014.

FIELD OF THE DISCLOSURE

The present disclosure generally relates to gas turbine engines and, more specifically, relates to systems for providing cooling air to gas turbine engine components, such as the turbine section.

BACKGROUND

Gas turbine engines are internal combustion engines typically used to provide thrust to an aircraft or to provide power for land-based applications. In general, a gas turbine engine may consist of a fan section and a core engine located downstream of the fan section. In an upstream to downstream direction, the core engine may generally include: 1) a compressor section, which may include a low pressure compressor (LPC) and a high pressure compressor (HPC) located downstream of the LPC, 2) one or more combustors, and 3) a turbine section, which may include a high-pressure turbine (HPT) and a low-pressure turbine (LPT) located downstream of the HPT. During operation, a portion of the air drawn into the fan section may be routed through a primary flowpath defined by the core engine. In the core engine, the air may be pressurized in the compressor section and then mixed with fuel and combusted in the combustor(s) to generate hot combustion gases. The hot combustion gases may then expand through and drive the turbine section which extracts energy from the hot combustion gases to power the compressor section and the fan section.

Certain components of the gas turbine engine, such as the rotating blades of the turbine section, may become hot during operation. As a result, many gas turbine engines incorporate a cooling system that supplies cooling air to the turbine section or other heat-susceptible structures. For example, in legacy gas turbine engine designs, a portion of the primary airflow exiting the high pressure compressor may be diverted through a path located radially inboard of the combustor to provide a 'turbine cooling air' to the HPT. However, this approach may reach its limitation as the cooling air reaches temperatures above the temperature limit of the material properties forming the turbine components.

A more advanced variation, as disclosed in U.S. Patent Application Publication Number 2013/0219917, cools the turbine cooling air by mixing it with a heat-exchange cooled 'buffer air' diverted from a bearing compartment to generate a 'buffer cooled cooling air' (or BCCA) that is then delivered to the HPT for cooling the turbine blades as well as other turbine structures. More specifically, this approach involves diverting a fraction of the turbine cooling air through a heat exchanger to generate the lower temperature buffer air that is then routed through the bearing compartment to cool the structures of the compartment as well as to buffer the bearing compartment seals. A fraction of the buffer air flowing through the bearing compartment is then diverted from the bearing compartment cooling air path through multiple tubes to join with the turbine cooling air to generate the BCCA that is then supplied to the HPT. While effective, a significant disadvantage of this approach is that it may require stronger/heavier bearing compartment structures and passageways that are capable of withstanding greater air volumes and pressures caused by the additional buffer air used to cool the turbine cooling air. In addition, the higher air pressures in the bearing compartment may present challenges for establishing acceptable pressure differentials across the carbon seals of the bearing compartment. Even further, the multiple tubes that carry the buffer air away from the bearing compartment to mix with the cooling air may create a difficult assembly process and add even further weight to the cooling system.

Clearly, there is a need for improved strategies for providing cooling air to turbine sections of gas turbine engines.

SUMMARY OF THE DISCLOSURE

In accordance with one aspect of the present disclosure, a method for providing cooling air to a turbine section of a gas turbine engine having a bearing compartment located radially inward of a diffuser case is disclosed. The method may comprise routing a cooling air toward the turbine section through a first conduit, diverting a bleed airflow from the first conduit through a heat exchanger, and cooling the bleed airflow in the heat exchanger to provide a buffer air. The method may further comprise routing at least a portion of the buffer air through a bypass conduit that bypasses the bearing compartment, mixing the buffer air exiting the bypass conduit with the cooling air exiting the first conduit to provide a buffer cooled cooling air, and delivering the buffer cooled cooling air to the turbine section.

In another refinement, routing at least a portion of the buffer air through the bypass conduit may comprise routing the buffer air through an annular duct extending axially through the diffuser case.

In another refinement, routing at least a portion of the buffer air through the bypass conduit may comprise routing the buffer air through at least one tube extending axially through the diffuser case.

In another refinement, routing at least a portion of the buffer air through the bypass conduit may comprise routing the buffer air exiting the heat exchanger through a second conduit, and diverting a portion of the buffer air from the second conduit through the bypass conduit.

In another refinement, the annular duct may provide fluid communication between the second conduit and the manifold.

In another refinement, routing the cooling air toward the turbine section through the first conduit may comprise diverting a portion of a primary airflow exiting a high pressure compressor of the gas turbine engine through the first conduit.

In accordance with another aspect of the present disclosure, a cooling system configured to provide cooling air to a turbine section of a gas turbine engine is disclosed. The gas turbine engine may comprise a compressor section, a combustor, and a diffuser case disposed radially inwards of the combustor and extending axially between an outlet of the compressor section and an inlet of the turbine section. The cooling system may comprise a first conduit disposed radially outward of the diffuser case and extending axially between the outlet of the compressor section and the inlet of the turbine section, a heat exchanger, and a bypass conduit extending axially through a cavity of the diffuser case and bypassing a bearing compartment located radially inward of the diffuser case. The cooling system may further comprise a manifold located at an outlet of the first conduit and the bypass conduit, and a nozzle assembly disposed downstream of the manifold and upstream of the inlet of the turbine section.

In another refinement, the cooling system may further comprise a second conduit extending from the heat exchanger to the bearing compartment.

In another refinement, the bypass conduit may be an annular duct extending axially through the diffuser case.

In another refinement, the bypass conduit may comprise at least one tube extending through the diffuser case.

In accordance with another aspect of the present disclosure, a gas turbine engine is disclosed. The gas turbine engine may comprise a fan section and a core engine located downstream of the fan section. The core engine may comprise: 1) a compressor section including a low pressure compressor located upstream of a high pressure compressor, 2) a combustor located downstream of the compressor section, 3) a turbine section located downstream of the combustor, and 4) a cooling system configured to provide a buffer cooled cooling air to the turbine section. The cooling system may comprise a first conduit configured to transmit a cooling air toward the turbine section, and a heat exchanger configured to cool a bleed airflow diverted from the cooling air to provide a buffer air. The cooling system may further comprise a bypass conduit configured to direct at least a portion of the buffer air through at least one passageway that bypasses a bearing compartment of the gas turbine engine. In addition, the cooling system may also comprise a manifold configured to allow the cooling air exiting the first conduit and the buffer air exiting the bypass conduit to mix and provide the buffer cooled cooling air, and a nozzle assembly configured to deliver the buffer cooled cooling air to the turbine section.

In another refinement, the bearing compartment may be located radially inward of a diffuser case of the gas turbine engine, and the diffuser case may be located radially inward of the combustor and it may extend axially between an outlet of the high pressure compressor and an inlet of the turbine section.

In another refinement, the bypass conduit may comprise an annular duct extending axially through the diffuser case.

In another refinement, the bypass conduit may comprise a tube extending axially through the diffuser case.

In another refinement, the cooling system may further comprise a second conduit configured to transmit the buffer air exiting the heat exchanger toward the bearing compartment, and the bypass conduit may be further configured to divert at least a portion of the buffer air from the second conduit around the bearing compartment.

In another refinement, the bypass conduit may provide fluid communication between the second conduit and the manifold.

In another refinement, the portion of the buffer air diverted through the bypass conduit may comprise about two-thirds of the buffer air flowing through the second conduit.

In another refinement, the second conduit may be configured to deliver at least a portion of the buffer air to the bearing compartment.

In another refinement, the first conduit may be configured to divert a portion of a primary airflow exiting the high pressure compressor toward the turbine section.

In another refinement, the first conduit may comprise an annular cavity located between the combustor and the diffuser case.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use for cooling a turbine section or for use in conjunction with a particular type of engine. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
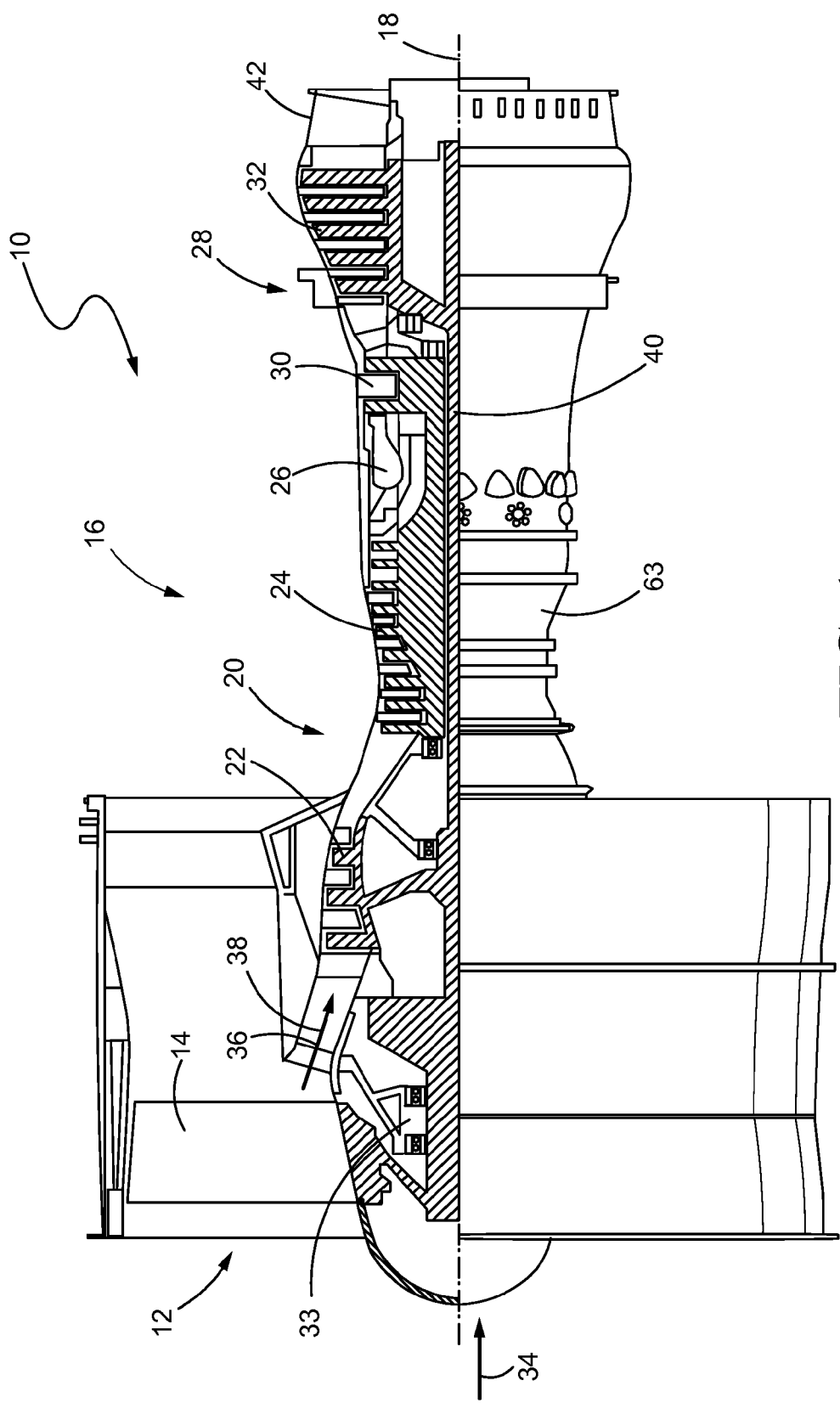
FIG. 1 is a side, partially cross-sectioned view of a gas turbine engine, constructed in accordance with the present disclosure.

Referring now to the drawings, and with specific reference to FIG. 1, a gas turbine engine 10 is depicted. The gas turbine engine 10 may be associated with an aircraft to provide thrust, or it may be used to provide power in power generation applications. It may consist of a fan section 12 having a fan 14, as well as a core engine 16 located axially downstream of the fan section 12 with respect to an engine central axis 18. In an upstream to downstream direction, the core engine 16 may include: 1) a compressor section 20 which may include a low pressure compressor (LPC) 22 located axially upstream of a high pressure compressor (HPC) 24, 2) an annular combustor 26 (or a series of circumferentially-spaced 'can' combustors), 3) and a turbine section 28 which may consist of a high pressure turbine (HPT) 30 located axially upstream of a low pressure turbine (LPT) 32. Although the gas turbine engine 10 is shown in FIG. 1 as a two spool turbofan engine, it will be understood that the engine 10 may have other architectures as well, such as a three-spool turbofan with mid-pressure compressor and turbine sections. Other configurations include direct drive engines that do not decouple the turbine section 28 from the fan section 12 and exclude a gear 33.

In operation, air 34 may be drawn into the engine 10 and it may be accelerated by the rotating blades of the fan 14, as best shown in FIG. 1. After passing through the fan section 12, a fraction of the indrawn air 34 may be routed through a primary flow pathway 36 defined by the core engine 16, as shown. In the primary flow pathway 36, a primary airflow 38 may first be compressed/pressurized in the LPC 22 and the HPC 24 of the compressor section 20, and it may then enter the combustor(s) 26 where it may be mixed with fuel and combusted to generate hot combustion gases. The hot combustion gases may then expand through and drive the rotation of the blades of the HPT 30 and the LPT 32 of the turbine section 28 which may, in turn, drive the rotation of the fan 14 and the compressor section 20 as all may be interconnected through one or more shafts 40. The gases may then be exhausted through an exhaust nozzle 42 to provide forward thrust to an associated aircraft or to provide power in power generation applications.

Figure 2:
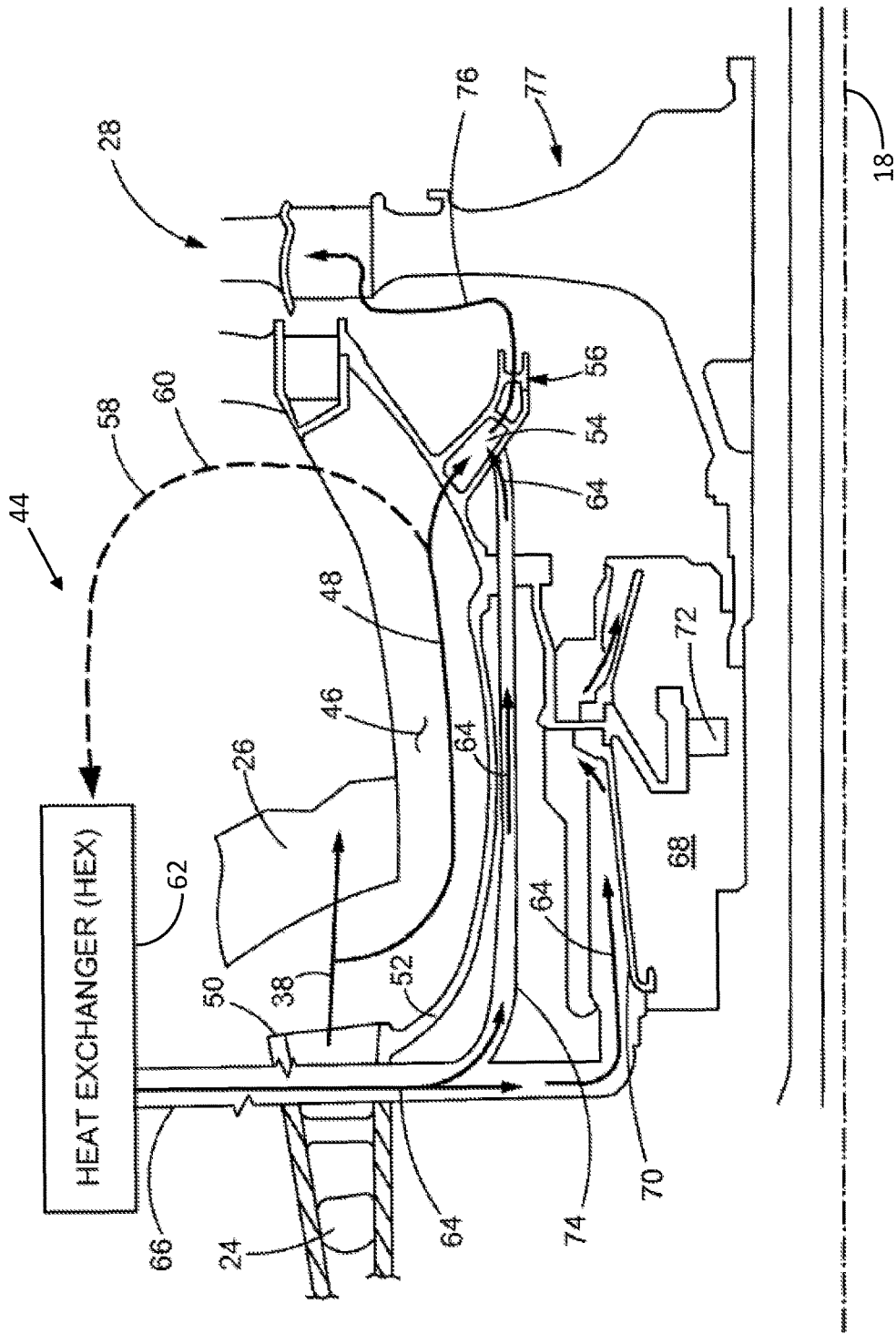
FIG. 2 is a side, cross-sectional view of an upper portion a cooling system of the gas turbine engine of FIG. 1 that provides a buffer cooled cooling air to a turbine section, constructed in accordance with the present disclosure.

Turning now to FIG. 2, a cooling system 44 for supplying cooling air to the HPT 30 of the turbine section 28 is shown. The cooling system 44 may be symmetrical about the engine central axis 18 such that only the upper portion of the cooling system 44 is shown for clarity. The cooling system 44 may include at least one first conduit 46 configured to transmit cooling air 48 diverted from the primary airflow 38 toward the turbine section 28. More specifically, the first conduit 46 may be configured to direct a fraction of the primary airflow 38 exiting a diffuser 50 located at an outlet of the HPC 24 prior to its entry into the combustor 26 to provide the cooling air 48 flowing toward the turbine section 28. The first conduit 46 may be disposed radially inward of the combustor 26 and in an annular cavity located between the combustor 26 and a diffuser case 52 that extends axially between the diffuser 50 and an inlet of the turbine section 28, as shown. In addition, the first conduit 46 may provide fluid communication between an outlet of the diffuser 50 and a manifold 54 located upstream from a nozzle assembly 56 leading to the HPT 30.

The cooling system 44 may further include a conduit system 58 configured to convey a bleed airflow 60 from the cooling air 48 to a heat exchanger (HEX) 62 which may be mounted on an engine case 63 or on another location of the gas turbine engine 10 (also see FIG. 1 showing the engine case 63). Depending on the location of the HEX 62, in some cases, the conduit system 58 may direct the bleed airflow 60 in an upstream direction, as shown in FIG. 2. Although depicted as a dashed line for clarity purposes, the conduit system 58 may include a single passageway or a network of passageways that guide the bleed airflow 60 to the HEX 62. As a non-limiting possibility, the bleed airflow 60 may consist of about 1.5% of the total primary airflow 38 flowing through the engine 10, although it may deviate substantially from this range as well depending on the design of the engine as well as various other factors. Once delivered to the HEX 62, the HEX 62 may cool the bleed airflow 60 by heat exchange with another medium to provide a cooled buffer air 64 which may have a lower temperature than the cooling air 48.

The cooling system 44 may further include a second conduit 66 that may transmit the buffer air 64 exiting the HEX 62 toward a bearing compartment 68 located radially inward of the diffuser case 52. The bearing compartment 68 may include a housing 70, a bearing 72 contained in the housing 70, and seals (not shown) configured to seal oil/lubricants inside of the housing 70, as well as various other components apparent to those skilled in the art. As one possibility, the second conduit 66 may extend in a radially inward direction from the HEX 62 and traverse the diffuser 50, as shown in FIG. 2, although it may have other configurations as well. The second conduit 66 may deliver at least a portion of the buffer air 64 to the bearing compartment 68 so that the buffer air 64 may flow through outer channels surrounding the housing 70 to cool the components of the bearing compartment 68 such as the bearing 72 and buffer the bearing compartment seals. As a non-limiting example, about one-third of the buffer air 64 flowing through the second conduit 66 may be delivered to the bearing compartment 68 via the second conduit 66.

To cool the cooling air 48, the cooling system 44 may further include at least one bypass conduit 74 that may route at least a portion of the buffer air 64 from the HEX 62 around the bearing compartment 68 in a bypass configuration for delivery in the manifold 54. As one possibility, the bypass conduit 74 may divert at least a portion of the buffer air 64 from the second conduit 66 around the bearing compartment 68, as shown. For example, it may divert about two-thirds of the buffer air 64 flowing through the second conduit 66 toward the manifold 54, although it may divert other fractions of the buffer air depending on various design considerations. The bypass conduit 74 may provide fluid communication between the second conduit 66 and the manifold 54 and it may extend axially through a cavity of the diffuser case 52, although it may be positioned at other regions of the gas turbine engine 10 as well. As one possible arrangement, the bypass conduit 74 may consist of one or more annular ducts that extend axially between the second conduit 66 and the manifold 54. Alternatively, it may consist of one or more tubes or pipes extending between the second conduit 66 and the manifold 54. Once the buffer air 64 flowing through the bypass conduit 74 reaches the manifold 54, it may mix with and cool the cooling air 48 exiting the first conduit 46 to generate a buffer cooled cooling air (BCCA) 76 having a lower temperature than the cooling air 48. The resulting BCCA 76 may then be delivered to the HPT 30 via the nozzle assembly 56. The BCCA 76 may then assist in cooling various structures of the HPT 30 such as the blades of a rotor assembly 77, as well other structures and downstream stages of the turbine section 28.

In essence, the bypass conduit 74 allows for separating the cooling functions of the buffer air 64 between a bearing compartment cooling function and a turbine cooling function. In this way, the bypass conduit 74 of the cooling system 44 provides a strategy for cooling the cooling air 48 with the buffer air 64 without subjecting the structures of the bearing compartment 68 to excess air volumes and pressures. In contrast with methods of the prior art which route additional buffer air 64 needed to cool the cooling air 48 through the bearing compartment 68 prior to mixing with the cooling air 48, the present disclosure lightens the pressure load experienced by the bearing compartment 68 by routing the additional buffer air 64 through the bypass conduit 74 instead. In this regard, the bearing compartment 68 of the present disclosure may be made lighter than gas turbine engine bearing compartments that rely on the aforementioned prior art strategy. In addition, the prior art strategy may require a plurality of tubes to carry the buffer air from the bearing compartment to the manifold in order to afford sufficient mixing with the cooling air. As the bypass conduit 74 of the cooling system 44 of the present disclosure may be a single annular duct, it may provide proper mixing with the cooling air 48 without the complicated assembly process and additional weight of the multiple delivery tubes used in the prior art systems. The reduced weight requirements of the bearing compartment 68 and the buffer air delivery configuration, as well as the simplified assembly process are at least some of the advantages that the cooling system 44 may have over the prior art cooling methods.

Figure 3:
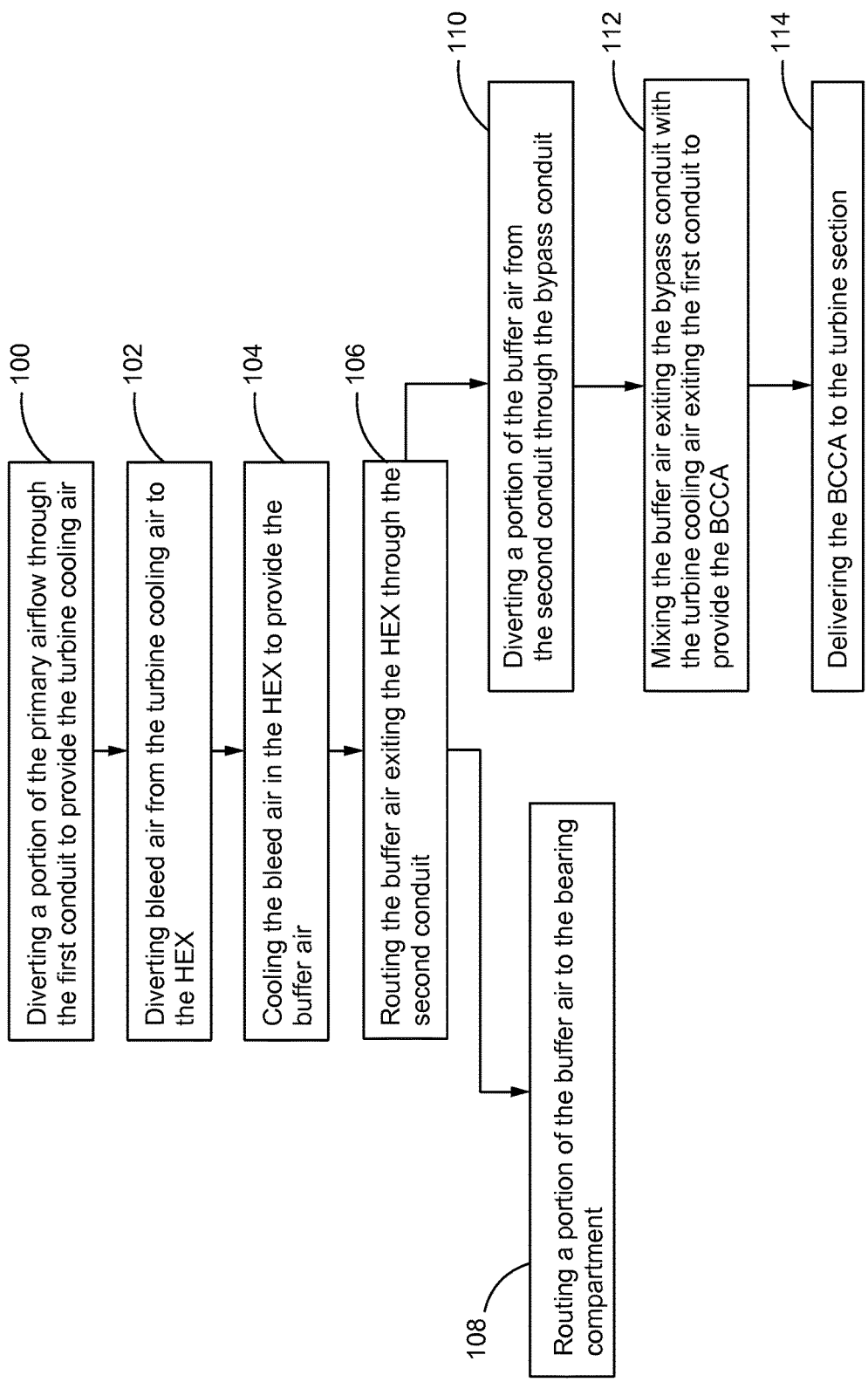
FIG. 3 is a flowchart depicting a series of steps involved in providing the buffer cooled cooling air to the turbine section using the cooling system of FIG. 2, in accordance with a method of the present disclosure.

A series of steps that may be involved in providing the BCCA 76 to the turbine section 28 using the cooling system 44 are depicted in FIG. 3. Beginning with a first block 100, a portion of the primary airflow 38 exiting the diffuser 50 may be diverted through the first conduit 46 to provide the cooling air 48 flowing toward the turbine section 28. A bleed air 60 from the cooling air 48 may then be diverted to the HEX 62 according to a next block 102. As explained above, diversion of the bleed air 60 may be achieved with the conduit system 58 (see FIG. 2). The bleed air 60 diverted from the cooling air 48 may then be cooled in the HEX 62 to provide the buffer air 64 which may then be routed through the second conduit 66 (blocks 104 and 106, respectively).

A portion of the buffer air 64 flowing through the second conduit 66 may then be routed to the bearing compartment 68 according to a block 108, and another portion of the buffer air 64 may be diverted from the second conduit 66 through the bypass conduit 74 to bypass the bearing compartment 68 according to a block 110, as shown. According to a next block 112, the buffer air 64 exiting the bypass conduit 74 may be mixed with the cooling air 48 exiting the first conduit 46 to provide the BCCA 76. Mixing of the buffer air 64 and the cooling air 48 may occur in the manifold 54 located upstream of the nozzle assembly 56, as explained above. Lastly, the BCCA 76 may then be supplied to the turbine section 28 via the nozzle assembly 56 according to a next block 114, as shown.

INDUSTRIAL APPLICABILITY

In general, it can therefore be seen that the technology disclosed herein has industrial applicability in a variety of settings including, but not limited to, gas turbine engines. In particular, the technology disclosed herein provides a strategy for supplying cooling air to the turbine section of a gas turbine engine without subjecting the bearing compartment to excess air volumes and pressures by providing a bypass conduit that directs heat-exchange cooled buffer air around the bearing compartment for mixing with turbine cooling air prior to entry into the HPT/turbine section. As a result, bearing compartments in gas turbine engines incorporating the cooling system of the present disclosure may be made smaller and/or lighter in weight than bearing compartments in prior art cooling systems which route the additional buffer air needed for lowering the temperature of the cooling air through the bearing compartment. In some cases, bearing compartments in gas turbine engines incorporating the cooling system of the present disclosure may have weights comparable to those of legacy gas turbine engine configurations which lack a system for cooling the cooling air with heat-exchange cooled buffer air. In addition, if the bypass conduit consists of an annular duct, it may provide more effective mixing of the buffer air with the cooling air in the manifold than prior art configurations that use a plurality of circumferentially-extending tubes to deliver buffer air from the bearing compartment to the manifold. The more effective mixing provided by the cooling system of the present disclosure may avoid temperature gradients in the cooling flow and provide more consistent BCCA temperatures to the HPT. In addition, compared with the prior art system, the cooling system disclosed herein may eliminate the need for the multiple tubes that deliver the heat-exchange cooled buffer air from the bearing compartment to the cooling air, as well as the need for various metering structures that meter high pressure buffer air down to pressures suitable for the bearing compartment. In this way, the cooling system disclosed herein may be lighter in weight and more simple to assemble than the cooling system of the prior art. It is expected that the technology disclosed herein may find wide industrial applicability in areas such as, but not limited to, aerospace and power generation applications.

What is claimed is:

1. A method for providing cooling air to a turbine section of a gas turbine engine having a bearing compartment located radially inward of a diffuser case, comprising: routing a cooling air toward the turbine section through a first conduit; diverting a bleed airflow from the first conduit through a heat exchanger; cooling the bleed airflow in the heat exchanger to provide a buffer air; routing at least a portion of the buffer air through a bypass conduit that bypasses the bearing compartment; mixing the buffer air exiting the bypass conduit with the cooling air exiting the first conduit to provide a buffer cooled cooling air; and delivering the buffer cooled cooling air to the turbine section, wherein routing at least a portion of the buffer air through the bypass conduit comprises: routing the buffer air exiting the heat exchanger through a second conduit; and diverting a portion of the buffer air from the second conduit through the bypass conduit.

2. The method of claim 1, wherein routing at least a portion of the buffer air through the bypass conduit comprises routing the buffer air through an annular duct extending axially through the diffuser case.

3. The method of claim 1, wherein routing at least a portion of the buffer air through the bypass conduit comprises routing the buffer air through at least one tube extending axially through the diffuser case.

4. The method of claim 1, wherein the annular duct provides fluid communication between the second conduit and the manifold.

5. The method of claim 4, wherein routing the cooling air toward the turbine section through the first conduit comprises diverting a portion of a primary airflow exiting a high pressure compressor of the gas turbine engine through the first conduit.

6. A cooling system configured to provide cooling air to a turbine section of a gas turbine engine comprising a compressor section, a combustor, and a diffuser case disposed radially inwards of the combustor and extending axially between an outlet of the compressor section and an inlet of the turbine section, the cooling system comprising: a first conduit disposed radially outward of the diffuser case and extending axially between the outlet of the compressor section and the inlet of the turbine section; a heat exchanger; a bypass conduit extending axially through a cavity of the diffuser case and bypassing a bearing compartment located radially inward of the diffuser case; a manifold located at an outlet of the first conduit and the bypass conduit; a nozzle assembly disposed downstream of the manifold and upstream of the inlet of the turbine section; and a second conduit extending from the heat exchanger toward the bearing compartment, and wherein the bypass conduit diverts from the second conduit around the bearing compartment.

7. The cooling system of claim 6, wherein the second conduit extends into a housing of the bearing compartment.

8. The cooling system of claim 7, wherein the bypass conduit is an annular duct extending axially through the diffuser case.

9. The cooling system of claim 8, wherein the bypass conduit comprises at least one tube extending through the diffuser case.

10. A gas turbine engine, comprising:
a fan section;
a core engine located downstream of the fan section, the core engine comprising a compressor section including a low pressure compressor located upstream of a high pressure compressor, a combustor located downstream of the compressor section, a turbine section located downstream of the combustor; and a cooling system configured to provide a buffer cooled cooling air to the turbine section, the cooling system comprising:
- a first conduit configured to transmit a cooling air toward the turbine section,
- a heat exchanger configured to cool a bleed airflow diverted from the first conduit to provide a buffer air,
- a bypass conduit configured to direct at least a portion of the buffer air through at least one passageway that bypasses a bearing compartment of the gas turbine engine, the bearing compartment is located radially inward of a diffuser case of the gas turbine engine, and wherein the diffuser case is located radially inward of the combustor and extends axially between an outlet of the high pressure compressor and an inlet of the turbine section,
- a manifold configured to allow the cooling air exiting the first conduit and the buffer air exiting the bypass conduit to mix and provide the buffer cooled cooling air, and
- a nozzle assembly configured to deliver the buffer cooled cooling air to the turbine section, and
- a second conduit configured to transmit the buffer air exiting the heat exchanger toward the bearing compartment, and wherein the bypass conduit is further configured to divert at least a portion of the buffer air from the second conduit around the bearing compartment.

11. The gas turbine engine of claim 10, wherein the bypass conduit comprises an annular duct extending axially through the diffuser case.

12. The gas turbine engine of claim 10, wherein the bypass conduit comprises a tube extending axially through the diffuser case.

13. The gas turbine engine of claim 10, wherein the bypass conduit provides fluid communication between the second conduit and the manifold.

14. The gas turbine engine of claim 13, wherein the portion of the buffer air diverted through the bypass conduit comprises two-thirds of the buffer air flowing through the second conduit.

15. The gas turbine engine of claim 13, wherein the second conduit is configured to deliver at least a portion of the buffer air to the bearing compartment.

16. The gas turbine engine of claim 15, wherein the first conduit is further configured to divert a portion of a primary airflow exiting the high pressure compressor toward the turbine section.

17. The gas turbine engine of claim 16, wherein the first conduit comprises an annular cavity located between the combustor and the diffuser case.

* * * * *